United States Patent
Braun

(10) Patent No.: US 6,723,760 B2
(45) Date of Patent: Apr. 20, 2004

(54) METHOD FOR PRODUCING EXPANDED OR EXPANDABLE POLYOLEFIN PARTICLES

(75) Inventor: Frank Braun, Ludwigshafen (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 10/240,682

(22) PCT Filed: Mar. 29, 2001

(86) PCT No.: PCT/EP01/03591

§ 371 (c)(1), (2), (4) Date: Oct. 3, 2002

(87) PCT Pub. No.: WO01/77213

PCT Pub. Date: Oct. 18, 2001

(65) Prior Publication Data

US 2003/0105174 A1 Jun. 5, 2003

(30) Foreign Application Priority Data

Apr. 7, 2000 (DE) .......................................... 100 17 428

(51) Int. Cl.[7] .............................. C08J 9/22; C08J 9/224; C08J 9/20
(52) U.S. Cl. .............................................. 521/58; 56/59
(58) Field of Search ............................... 521/56, 58, 59

(56) References Cited

U.S. PATENT DOCUMENTS 4,602,047 A   7/1986   Endo

FOREIGN PATENT DOCUMENTS

| EP | 053 333 | 6/1982 |
| EP | 123 144 | 10/1984 |

OTHER PUBLICATIONS

JP Abstract XP–002172327—JP 11100468.
JP Abstract XP–002172328—J62273235.
Patent Abstracts of Japan –vol. 1996, No. 09 (1994).
Patent Abstracts of Japan—vol. 018, No. 430.
Equilvent DE 199 50 420 = 0050/50811 (BASF).

*Primary Examiner*—Morton Foelak
(74) *Attorney, Agent, or Firm*—Keil & Weinkauf

(57) ABSTRACT

The invention relates to a process for the production of expanded or expandable polyolefin beads by impregnating polyolefin granules with a volatile blowing agent in suspension under pressure. As suspension aid, use is made of a mixture of a water-insoluble inorganic compound and a surfactant, and the impregnation is carried out in the presence of a surface-active polymer carrying carboxyl or carboxylate groups.

8 Claims, No Drawings

METHOD FOR PRODUCING EXPANDED OR EXPANDABLE POLYOLEFIN PARTICLES

The present invention relates to a process for the production of expanded or expandable polyolefin (PO) beads by impregnating PO granules with a volatile blowing agent in suspension under pressure at elevated temperature.

Said process is known per se and is operated on a large industrial scale. According to EP-A 53 333, EP-A 123 144 and DE-A 34 31 245 or DE-A 199 50 420, the blowing agents employed are organic compounds, such as halogenated hydrocarbons, for example dichlorodifluoromethane, or hydrocarbons, for example butane. The suspension medium is water, which can also be used as a mixture with alcohols. The suspension always contains a suspension aid, which is intended to prevent the PO granules from caking together or agglomerating in the suspension. Suitable suspension stabilizers are water-insoluble inorganic compounds, such as alkaline earth metal carbonates, phosphates or oxides, which are employed together with an ionic surfactant, for example a sulfonate.

However, this stabilizer system has a severe disadvantage: the finely divided solid deposits on the polymer surface and thus prevents the beads fusing together during subsequent conversion into moldings. The solid must therefore be removed from the surface before processing, which is effected in practice by acid washing. This results to a considerable pollution of wastewater by the acid and the stabilizer system used.

It is an object of the present invention to overcome this disadvantage.

We have found that this object is achieved by addition of a polymer containing carboxyl or carboxylate groups during the impregnation or after the impregnation.

The invention therefore relates to a process for the production of expanded or expandable PO beads by impregnating PO granules with a volatile blowing agent in aqueous suspension in the presence of a water-insoluble inorganic compound in combination with a surfactant as suspension aid at elevated temperature under pressure, and the optionally cooling the beads, followed by decompression, in which the impregnation is carried out in the presence of a polymer containing carboxyl or carboxylate groups.

The invention furthermore relates to a process for the production of expanded or expandable PO beads by impregnating PO granules with a volatile blowing agent in aqueous suspension in the presence of a water-insoluble inorganic compound in combination with a surfactant as suspension aid at elevated temperature under pressure, and then optionally cooling the beads, followed by decompression, in which the beads are washed with an aqueous solution of a polymer containing carboxyl or carboxylate groups.

For the purposes of the present invention, polyolefins are
a) homopolypropylene,
b) random copolymers of propylene with from 0.1 to 15% by weight, preferably from 0.5 to 12% by weight, of ethylene and/or a $C_4$–$C_{10}$-α-olefin, preferably a copolymer of propylene with from 0.5 to 6% by weight of ethylene or with from 0.5 to 15% by weight of 1-butene, or a terpolymer of propylene, from 0.5 to 6% by weight of ethylene and from 0.5 to 6% by weight of 1-butene, or
c) a mixture of a) or b) with from 0.1 to 75% by weight, preferably from 3 to 50% by weight, of a polyolefin elastomer, for example an ethylene-propylene block copolymer containing from 30 to 70% by weight of propylene,
d) polyethylene (PE-LLD, PE-LD, PE-MD or PE-HD) and
e) a mixture of the polyolefins mentioned under a) to d) (if desired after addition of phase promoters).

Preference is given to homopolymers and copolymers of propylene with up to 15% by weight, in particular from 1 to 5% by weight, of ethylene and/or 1-butene.

The crystalline melting point (DSC maximum) of the polyolefins listed under a) to e) is generally from 90 to 170° C. Their enthalpy of melting, determined by the DSC method, is preferably from 20 to 300 J/g, and the melt flow index MFI (230° C., 2.16 kp for propylene polymers and 190° C., 2.16 kp for ethylene polymers) in accordance with DIN 53 735 is from 0.1 to 100 g/10 min.

The production of the expanded or expandable PO beads starts from PO granules, which preferably have a mean diameter of from 0.2 to 10 mm, in particular from 0.5 to 5 mm. 100 parts by weight of these granules are dispersed in from 100 to 500 parts by weight of the suspension medium in a stirred-tank reactor. The preferred suspension medium is water, which can also be used as a mixture with organic liquids, for example ethanol and methanol. The suspension medium contains suspension aids, preferably in amounts of from 0.01 to 10% by weight, in particular from 0.1 to 10% by weight, particularly preferably from 0.5 to 8% by weight, based on the PO granules. The water-insoluble inorganic compound employed is a finely divided metal oxide, metal carbonate or metal phosphate, particularly preferably tricalcium phosphate, calcium carbonate, magnesium pyrophosphate, aluminum oxide, zinc carbonate, magnesium carbonate, titanium dioxide or siliceous earth. This water-insoluble compound is employed in combination with an ionic surfactant, for example a sulfonate or sulfate, or with a nonionic surfactant which has a hydrophilic moiety and a hydrophobic moiety, for example an ethoxylate of fatty alcohols, oxo alcohols, alkyl phenols, amines or amides, or a copolymer of ethylene oxide and propylene oxide. Examples of suitable polymers containing carboxyl or carboxylate groups are homopolymers of (meth)acrylic acid, copolymers of (meth)acrylic acid with maleic acid or of maleic acid with $C_2$–$C_{22}$-olefins, or alkali metal salts, in particular sodium salts, of these polymers, preferably having molar masses of from $10^3$ to $2 \cdot 10^5$ g/mol.

The blowing agents employed can be either organic liquids or inorganic gases, or mixtures thereof. Suitable liquids are halogenated hydrocarbons, but preference is given to saturated, aliphatic hydrocarbons, in particular those having 3 to 8 carbon atoms. Particular preference is given to n-butane. Suitable inorganic gases are nitrogen, air, ammonia and carbon dioxide. For expandable PO beads, blowing agents having a relatively high boiling point, for example pentane, should be employed.

The blowing agent is employed in amounts of, preferably, from 1 to 50% by weight, in particular from 3 to 30% by weight, based on 100 parts by weight of polymer. The blowing agent can be added before or during heating of the reactor contents to the decompression temperature. This should be from 40° C. to 20° C. above the crystalline melting point of the polyolefin. In the case of the preferred propylene polymers, temperatures of from 110° C. to 180° C., in particular from 120° C. to 160° C., are used.

Depending on the amount and type of the blowing agent and on the level of the temperature, a pressure of from 2 to 100 bar generally arises in the reactor.

For the production of expanded PO beads, the reactor is decompressed when the decompression temperature has been reached, the decompression advantageously taking place in an intermediate tank in which a pressure of from 0.5 to 5 bar preferably prevails. During decompression of the reactor, the blowing agent-containing PO granules expand, and PO foam beads having a mean diameter of from 1 to 20 mm are formed.

For the production of expandable PO beads in accordance with DE-A 199 50 420, the reactor contents are preferably cooled to room temperature before the decompression.

The beads are separated off from the aqueous solution containing the majority of the suspension aid, washed and dried, advantageously using washing water without added acid.

In an alternative embodiment of the invention, the polymer containing carboxyl or carboxylate groups is not added during the impregnation, but instead the beads separated off from the suspension medium are washed with a preferably from 0.01 to 20% strength by weight aqueous solution of the polymer.

Expandable PO beads can be stored for several hours at room temperature, even for several weeks in sealed containers, without significant loss of blowing agent occurring. These beads can be expanded in a conventional manner in pressure prefoamers to give PO foam beads.

The bulk density of the PO foam beads is from 5 to 400 g/l, in particular from 10 to 300 g/l. The foam beads are predominantly closed-cell and have from 2 to 3000 cells/mm$^2$, preferably from 5 to 2500 cells/mm$^2$, in particular from 10 to 1500 cells/mm$^2$.

The PO foam beads can be fused by conventional methods using steam or hot air to give foam moldings which are used in the automobile, packaging and leisure industries.

EXAMPLE 6000 parts of a propylene-ethylene random copolymer having an ethylene content of about 2% by weight, 400 parts of calcium carbonate, 8 parts by a block copolymer of ethylene oxide and propylene oxide (molar mass 8000 g/mol, ethylene content 80%) and 1 part of a copolymer of maleic acid and acrylic acid (Na salt, molar mass 50000 g/mol, SOKALAN CP 7 from BASF) are dispersed in 14000 parts of water in a closed stirred-tank reactor. After addition of 1400 parts of butane, the reactor is heated to about 130° C. During this heating, the pressure rises to about 20 bar. The contents of the reactor are subsequently decompressed into an intermediate tank. After the liquid phase has been let out, the product is rinsed with water. The dried foam beads have a bulk density of 17 g/l. They can be fused using steam to give stable moldings.

I claim:

1. A process for the production of expanded polyolefin beads by impregnating polyolefin granules with a volatile blowing agent in aqueous suspension in the presence of at least 0.5% by weight, based on the polyolefin granules, of a water-insoluble inorganic compound in combination with a surfactant as suspension aid at elevated temperature under pressure followed by decompression, which comprises carrying out the impregnation in the presence of a polymer containing carboxyl or carboxylate groups.

2. A process for the production of expandable polyolefin beads by impregnating polyolefin granules with a volatile blowing agent in aqueous suspension in the presence of at least 0.5% by weight, based on the polyolefin granules, of a water-insoluble inorganic compound in combination with a surfactant as suspension aid at elevated temperature under pressure, and then cooling the beads, followed by decompression, which comprises carrying out the impregnation in the presence of a polymer containing carboxyl or carboxylate groups.

3. A process as claimed in claim 1 or 2, wherein the polymer is employed in amounts of from $10^{-3}$ to $10^{4}$% by weight, based on the water-insoluble inorganic compound.

4. A process as claimed in claim 1 or 2, wherein the polymer is a homopolymer of (meth)acrylic acid, a copolymer of (meth)acrylic acid with maleic acid or of maleic acid with a $C_2$–$C_{22}$-olefin, or an alkali metal salt of these polymers.

5. A process as claimed in claim 1, wherein the water-insoluble inorganic compound is a finely divided metal oxide, metal carbonate or metal phosphate.

6. A process as claimed in claim 5, wherein the water-insoluble inorganic compound is tricalcium phosphate, calcium carbonate, magnesium pyrophosphate, aluminum oxide, zinc carbonate, magnesium carbonate, titanium dioxide or siliceous earth.

7. A process according to the preamble of claim 1, wherein, after separation from the suspension medium, the expanded or expandable polyolefin beads are washed with an aqueous solution of a polymer containing carboxyl or carboxylate groups.

8. A process as claimed in claim 1, wherein the polymer is employed in amounts of from $10^{-2}$ to $10^{2}$% by weight based on the water-insoluble inorganic compound.

* * * * *

UNITED STATES PATENT AND TRADEMARK OFFICE
CERTIFICATE OF CORRECTION

PATENT NO. : 6,723,760 B2
DATED : April 20, 2004
INVENTOR(S) : Braun et al.

It is certified that error appears in the above-identified patent and that said Letters Patent is hereby corrected as shown below:

Title page,
Item [54], Title, "METHOD FOR PRODUCING EXPANDED OR EXPAND-ABLE POLYOLEFIN PARTICLES" should be -- PROCESS FOR THE PRODUCTION OF EXPANDED OR EXPANDABLE POLYOLEFIN BEADS --

Column 4,
Line 10, "carboxylate groups." should be -- carboxylate salt groups or washing the expanded or expandable polyolefin beads with an aqueous solution of a polymer containing carboxyl or carboxylate groups. --
Line 20, "carboxylate groups." should be -- carboxylate salt groups or washing the expanded or expandable polyolefin beads with an aqueous solution of a polymer containing carboxyl or carboxylate groups. --
Line 21, "claim 1 or 2," should be -- claim 1, --
Line 24, "claim 1 or 2" should be -- claim 1, --

Signed and Sealed this

Nineteenth Day of April, 2005

JON W. DUDAS
*Director of the United States Patent and Trademark Office*